(12) United States Patent
Daniel et al.

(10) Patent No.: US 6,503,548 B1
(45) Date of Patent: *Jan. 7, 2003

(54) ICE CONFECTION

(75) Inventors: Adrian Daniel; Ian Lacy; Jon Richard Oldroyd, all of Bedford (GB)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/521,720

(22) Filed: Mar. 9, 2000

(30) Foreign Application Priority Data

| Mar. 10, 1999 | (GB) | ................................................ 9905524 |
| Jul. 23, 1999 | (EP) | ............................................. 99305842 |

(51) Int. Cl.⁷ .................................................. A23G 9/00
(52) U.S. Cl. ........................ 426/249; 426/565; 426/100; 426/101; 426/139; 426/656
(58) Field of Search ................................ 426/565, 249, 426/250, 100, 101, 540, 524, 139, 656, 104, 660

(56) References Cited

U.S. PATENT DOCUMENTS

| 3,969,531 | A |   | 7/1976  | Cornelius       |
| 4,565,643 | A | * | 1/1986  | Arai et al.     |
| 4,738,862 | A |   | 4/1988  | Bee             |
| 4,826,656 | A |   | 5/1989  | Huber et al.    |
| 5,118,792 | A |   | 6/1992  | Warren et al.   |
| 5,620,732 | A | * | 4/1997  | Clemmings et al.|
| 5,852,172 | A | * | 12/1999 | Griffith        |
| 6,017,574 | A | * | 1/2000  | Clemmings et al.|

FOREIGN PATENT DOCUMENTS

| EP | 0 843 010 A1 | 5/1998 |
| GB | 1050213      | 12/1966 |
| GB | 1313807      | 4/1973 |
| GB | 2 315 662 A  | 2/1998 |
| GB | 2 315 753 A  | 2/1998 |
| GB | 2 328 136 A  | 2/1999 |
| WO | WO 92/22581  | 12/1992 |
| WO | WO 96/39878  | 12/1996 |
| WO | WO 97/02343  | 1/1997 |
| WO | WO 98/04146  | 2/1998 |
| WO | WO 98/04147  | 2/1998 |
| WO | WO 98/04148  | 2/1998 |
| WO | WO 98/04699  | 2/1998 |
| WO | WO 98/22591  | 5/1998 |
| WO | WO 98/41106  | 9/1998 |
| WO | WO 98/41109  | 9/1998 |
| WO | WO 99/38386  | 8/1999 |

OTHER PUBLICATIONS

"Antifreeze Proteins And Their Potential Use In Frozen Foods", Marilyn Griffith and K. Vanya Ewart, Biotechnology Advances, vol. 13, No. 3, pp. 375–402, 1995.

"A Low–Temperature Scanning Electron Microscopy Study Of Ice Cream, Techniques and General Microstructure", K.B. Caldwell, H.D. Goff and D.W. Stanley, Food Structure, vol. 11 (1992), pp. 1–9.

"Low Temperature Sugar–Water Equilibrium Curve By A Rapid Calorimetric Method", B. de Cindio, S. Correra & V. Hoff, Journal of Food Engineering, vol. 24 (1995), pp. 405–415.

"Unbiased Estimation Of The Euler–Poincare Characteristic", B. Pinnamaneni, C. Lantuéjoul, J. Jernot and J. Chermant, Acta Stereol, 1989; 8/2, pp. 101–106.

* cited by examiner

Primary Examiner—Nina Bhat
(74) Attorney, Agent, or Firm—Gerard J. McGowan, Jr.

(57) ABSTRACT

The method of adding an antifreeze protein to an ice confection to restrict the flow of flavor or color ions or molecules present as either solutes or a dispersion, wherein the ice confection contains no protein other than the antifreeze protein.

7 Claims, No Drawings

ICE CONFECTION

TECHNICAL FIELD OF THE INVENTION

The invention relates to the use of antifreeze proteins in ice confections. In particular the invention relates to the use of antifreeze proteins in ice confections to restrict the flow of flavours and/or colour.

BACKGROUND OF THE INVENTION

It is a well-known problem that when an ice confection such as a water ice is consumed the flavour and colour is quickly sucked out of the product leaving essentially a block of ice which is of limited enjoyment to eat.

Further in ice confections such as water ice which are comprised of a number of different components, each having a different colour or flavour, the boundary between each component is not sharp and distinct because of the flow of the colour or flavour to a certain extent from one component to another. Consequently it has not been possible to date to provide an ice confection having thin components of a different flavour or colour which remain distinct.

WO 98/04146 (Unilever) discloses that AFPs can be incorporated into frozen food products such as ice confections to provide desirable product properties providing that the product and processing conditions are varied such that the ice crystals provided in the product have an aspect ratio of more than 1.9, preferably from 1.9 to 3.0. The specific examples in WO 98/04146 are all ice cream compositions. WO 98/04146 does not teach that it is possible to restrict the flow of colour and/or flavour in water ice products by the inclusion of an antifreeze protein in the water ice composition.

WO 96/39878 discloses a method for making a frozen composition for storage, the method not requiring a hardening step prior to storage. The frozen composition contains an antifreeze protein, in particular Type I AFP. Examples show the preparation of an aerated ice cream and an aerated frozen yoghurt. WO 96/39878 does not teach that it is possible to restrict the flow of colour and/or flavour in water ice products by the inclusion of an antifreeze protein in the water ice composition.

U.S. Pat. No. 5,118,792 (Warren et al) discloses the addition of fusion proteins, and in particular the fusion protein protein A-Saf5 into foods which are to be consumed frozen, for example, ice cream, frozen yoghurt, ice milk, sherbet, popsicles and frozen whipped cream. No examples are given where a final ice confection product is provided containing such fusion proteins. It is shown in Example 3B that when a popsicle formulation is used within the "splat assay", growth of the ice crystals is restricted. U.S. Pat. No. 5,118,792 does not teach that it is possible to restrict the flow of colour and/or flavour in water ice products by the inclusion of an antifreeze protein in the water ice composition.

We have now found that the addition of antifreeze proteins to ice confections restricts the flow of flavour and/or colour.

DISCLOSURE OF THE INVENTION

Accordingly the invention provides the use of an antifreeze protein within an ice confection to restrict the flow of flavour or colour ions or molecules present as either solutes or a dispersion wherein the ice confection contains no protein other than the antifreeze protein.

By antifreeze protein (AFP) is meant a protein which has significant ice recrystallisation inhibition properties as measured in accordance with Example 1. The AFP provides an ice particle size upon recrystallisation of less than 20 μm, more preferred from 5 to 15 μm.

Preferably the ice confection comprises at least 0.0005% by weight antifreeze protein, more preferably 0.0025% by weight antifreeze protein. Typically the ice confection will comprise from 0.0005% by weight to 0.005% by weight antifreeze protein.

For some applications it may be advantageous to include a mixture of two or more different AFPs into the ice confection.

The AFP for use in products of the invention can be any AFP suitable for use in food products. Examples of suitable sources of AFP are for example given in the article "Antifreeze proteins and their potential use in frozen food products", Marylin Griffith and K. Vanya Ewart, Biotechnology Advances, vol 13, pp375–402, 1995 and in patent applications WO 98/04699, WO 98/04146, WO 98/04147, WO 98/04148 and WO 98/22591.

The AFPs can be obtained from their sources by any suitable process, for example the isolation processes as described in the above mentioned documents.

One possible source of AFP materials is fish. Examples of fish AFP materials are antifreeze glycoproteins (AFGP) (for example obtainable from Atlantic cod, Greenland cod and Tomcod), type I AFP (for example obtainable from Winter flounder, Yellowtail flounder, Shorthorn sculpin and Grubby sculpln), Type II AFP (for example obtainable from Sea raven, Smelt and Atlantic herring) and type III AFP (for example obtainable from Ocean Pout, Atlantic wolffish, Radiated shanny, Rock gunnel and Laval's eelpout). A preferred example of the latter type is described in WO 97/02343.

Another possible source of AFP material is invertebrates. Also AFPs may be obtained from Bacteria.

A third possible source of AFP material is plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both naturally occurring species may be used or species which have been obtained through genetic modification. For example micro-organisms or plants may be genetically modified to express AFPs and the AFPs may then be used in accordance to the present invention.

Genetic manipulation techniques may be used to produce AFPs having at least 80%, more preferred more than 95%, most preferred 100% homology to the AFPs directly obtained from the natural sources. For the purpose of the invention these AFPs possessing this high level of homology are also embraced within the term "AFDs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For some natural sources the AFPs may consist of a mixture of two or more different AFPs.

Preferably the antifreeze protein is chosen such that it gives an aspect ratio of more than 1.9 to the ice crystal, preferably from 1.9 to 3.0, more preferably from 2.0 to 2.9, even more preferred from 2.1 and 2.8 (see WO 98/04146). Aspect ratio is defined as the maximum diameter of a particle divided by its minimum diameter. The aspect ratio can be determined by any suitable method. A preferred method is illustrated in the Examples (Example 3).

For the purpose of the invention the preferred AFPs are derived from fish. Especially preferred is the use of fish proteins of the type III, most preferred HPLC 12 as described in our case WO 97/02343.

Suitable ice confections which contain no protein other than the AFP include water ices, sorbet, granitas and frozen fruit purées.

Preferably the ice confection is a water ice.

By water ice is meant a frozen solution made essentially from water, sugar, fruit acid or other acidifying agent, colour, fruit or fruit flavouring.

The water ice will typically have an ice content of at least 30% by volume when measured at −18° C., more preferably at least 40% by volume when measured at −18° C., most preferably at least 50% by volume when measured at −18° C.

The ice content may be determined following the techniques described in the article by B de Cindio and S Correra in the Journal of Food Engineering, Volume 24, pages 405–415, 1995. The enthalpy data required for this technique is obtained using adiabatic calorimetry (Holometrix Adiabatic Calorimeter). The ice contents as expressed herein are measured on an 80 g sample poured into the sample holder of the calorimeter and cooled to −75° C. by placing the assembly in dry ice prior to placing in the calorimeter (pre-cooled to between −70° C. and −80° C.). The enthalpy data obtained was analysed to give ice content as a function of the temperature following the method of Cindio and Carrera.

In general the water ice has a total soluble solids content of less than 40% by weight, preferably less than 25% by weight, most preferably less than 15% by weight. For low calorie water ices the soluble solids content may be as low as approximately 5% by weight.

The total soluble solids content is measured at 4° C. and is the % by weight of the total composition that is dissolved at that temperature.

The ice confection may be aerated or unaerated, preferably the ice confection is unaerated.

By unaerated is meant an ice confection having an overrun of less than 25% (equivalent to 0.2 volume fraction of air), preferably less than 10% (equivalent to 0.09 volume fraction of air). During the processing of the ice confection no deliberate steps such as whipping are undertaken to increase the gas content of the product. However, it should be realised that during normal methods for the preparation of non-aerated ice confections, low levels of gas or air may be incorporated into the product, for example due to the mixing conditions use.

Typical colour materials used in ice confections could for example include carmoisine, carotene, anthocyanins, chlorophyll, chlorophyllins, copper complexes of chlorophylls & chlorophyllins, riboflavin, riboflavin-5'-phosphate, caramels, vegetable carbon black, paprika extract, capsanthin, capsorubin, beetroot Red, calcium carbonate, titanium dioxide, iron oxides & hydroxides, annatto extract, curcumin, tartrazine, quinoline yellow, sunset yellow FCF, cochineal, ponceau 4R, allura red AC, patent blue V, indigo carmine, brilliant blue FCF, green S, brilliant black BN, brown HT, lycopene, beta-apo-8'-carotenal (C30), ethyl ester of Beta-apo-8'-carotenlc acid (C30) and lutein Typical flavour materials used in ice confections could for example include natural, nature identical or synthetic flavour compounds, examples of which include; cherry, strawberry, raspberry, orange, banana, lemon, lime, lychee, guava, passion fruit, mango, grape, kiwi, melon, pineapple, papaya, apple, plum, apricot, peach, pear, mint, toffee, caramel, licorice, coffee, cotton candy and bubblegum.

The inclusion of antifreeze proteins into ice confections results in the formation of a strong, close-packed continuous network of ice crystals within the ice confection.

By close-packed continuous network of ice crystals is meant that any given ice crystal is connected to at least one other ice crystal.

In unaerated ice confections which have been frozen with agitation, the degree of network formation can be measured as contiguity.

Contiguity is defined as the ratio of the particle to particle interface area divided by the total interface area. It is thus a measure of the degree of network formation of the particle phase. Example 2 shows a method for the measurement of contiguity.

Unaerated ice confections according to the nvention have a contiguity of at least 0.2, as measured by the test given in Example 2, for an ice content of from 50–90%, preferably 54–85% by weight when measured at −18° C.

In unaerated ice confections which have been frozen by any means, the degree of network formation can be measured as the Euler-Poincare characteristic of the ice phase. The Euler-Poincare characteristic is a measure of the degree of network formation of a particular phase. The lower and more negative the value of the Euler-Poincare characteristic, the greater the continuity of the phase in question. Example 4 shows a method for the measurement of the Euler-Poincare characteristic.

Unaerated ice confections according to the invention have an ice phase Euler-Poincare characteristic of less than −150 $mm^{-2}$, as measured by the test given in Example 4, for an ice content of from 50–90%, preferably 54–85% by weight when measured at −18° C.

The use of an antifreeze protein within an ice confection to restrict the flow of flavour or colour ions or molecules present as either solutes or a dispersion provides a number of advantages.

In particular, ice confection products are provided for which the flavour and/or colour is not significantly sucked out during consumption. Flavour and/or colour is retained throughout the ice confection during the total consumption time.

A further advantage of the use of AFP to restrict the flow of flavour and/or colour is that multi-component products may be provided, each component having a different flavour and/or colour and the distinction between each comoonent remains sharp. In particular this allows produces having thin components of different colour and/or flavour to be provided. Each thin component remaining distinct from one another, there being substantially no merging of the different flavour and/or colour over time.

The ice confection according to the invention may comprise the entire product or may be included within a composite product.

For example a product may be provided having a conventional ice cream core coated with 2 or more thin layers of water ice containing AFP, each layer of water ice being a different flavour and/or colour.

EXAMPLES

The invention will now be illustrated by means of the following examples.

Example 1

Method of determining whether an AFP possesses ice recrystallisation inhibition properties.

Recrystallisation inhibition properties can be measured using a modified "splat assay" (Knight et al, 1988). 2.5 $\mu l$ of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at $-80°$ C. in a box of dry ice. When all sandwiches have been prepared, sandwiches are transferred from the $-80°$ C. hexane bath to the viewing chamber containing hexane held at $-6°$ C. using forceps pre-cooled in the dry ice. Upon transfer to $-6°$ C., sandwiches can be seen to change from a transparent to an opaque appearance. Images are recorded by video camera and grabbed into an image analysis system (LUCIA, Nikon) using a 20× objective. Images of each splat are recorded at a time=0 and again after 60 minutes. The size of the ice-crystals in both assays is compared by placing the slides within a temperature controlled cryostat cabinet (Bright Instrument Co Ltd, Huntingdon, UK). Images of the samples are transferred to a Quantimet 520 MC image analysis system (Leica, Cambridge UK) by means of a Sony monochrome CCD video camera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30–60 minutes is similar or only moderately (less than 10%) increased compared to the size at t=0, and/or the crystal size is less than 20 micrometer, preferably from 5 to 15 micrometer this is an indication of good ice recrystallisation inhibition properties.

Example 2

Measurement of Contiguity

Contiguity is measured using microstructural images of the ice confection using cryogenic scanning electron microscopy (SEM). Structures are imaged using the technique described in "A low temperature scanning electron microscopy study of ice cream. I. Techniques and general microstructure" Food Structure Vol. 11 (1992), pp 1–9.

In a particulate composite, the Contiguity of the particulate phase is defined as the ratio of the particle to particle interface area divided by the total internal interface area. It is a measure of the degree of network formation of the particulate phase. In ice confections the particles are ice crystals within the matrix and thus contiguity of the ice is defined as;

$$C_{ii} = \frac{A_{ii}}{(A_{ii} + A_{im})}$$

where $C_{ii}$ is the contiguity, $A_{ii}$ is the total interfacial surface area of ice-ice interfaces and $A_{im}$ is the interfacial surface area of ice-matrix interfaces. Contiguity can be measured from microstructural images of random planar surfaces cut through the material. Cryo-SEM images of flat fracture surfaces of unaerated ice confection are sufficient for this.

By placing an array of lines on the image of the microstructure, the number of intercepts of these lines with ice-ice and ice-matrix interfaces are counted and combined in the following equation, to give the contiguity;

$$C_{ii} = \frac{2N_{ii}}{(2N_{ii} + N_{im})}$$

where $N_{ii}$=number per unit length of ice-ice intercepts and $N_{im}$=number per unit length of ice-matrix intercepts.

Ideally, approximately 800 interfaces were counted from a total of 5 images that are representative of each sample's structure.

To determine contiguity, two sets of measurements were taken from each image. After placing a regular set of lines onto the image, the number of intercepts of the ice-matrix and ice-ice interfaces with these lines were counted, only including all obvious ice-ice interfaces. The count was then repeated, but this time with all possible ice-ice interfaces included. As such, a maximum ice contiguity measurement and a minimum ice contiguity measurement was made for each image. The mean of these figures is then taken as the contiguity value.

Example 3

Aspect Ratio Measurement

Samples were equilibrated at $-18°$ C. in a Prolan environmental cabinet for approximately 12 hours. Microscopic slides were prepared by smearing a thin layer of ice confection from the centre of thin glass plates.

Each slide was transferred to a temperature controlled microscopic stage (at $-18°$ C.) where images of ice crystals (about 400 individual ice crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest diameter (length), shortest diameter (breadth), the aspect ratio (length/breadth).

The average aspect ratio for the crystals was calculated.

Example 4

Measurement of Euler-Poincare Characteristic

The Euler-Poincare characteristic is measured using microstructural images of the ice confection using cryogenic scanning electron microscopy (SEM). Structures are imaged using the technique described in "A low temperature scanning electron microscopy study of ice cream. I. Techniques and general microstructure" Food Structure Vol. II (1992), pp 1–9.

In a two-phase composite structure, the degree of continuity of one phase can be measured using the Euler-Poincare characteristic. The lower the value of the Euler-Poincare characteristic for a phase, the more continuous or connected that phase is within the microstructure. The Euler-Poincare characteristic can be a positive or negative number. The definition of the Euler-Poincare characteristic is given in "Unbiased estimation of the Euler-Poincare characteristic" by B. P. Pinnamaneni, C. Lantuejoul, J. P. Jernot and J. L. Chermant, Acta Sterelogica, 1989, 8/2, p101–106.

To measure the Euler-Poioncare characteristic for ice in ice confections, identification of the ice and matrix phases on the microstructural images was performed and using an image analysis system, the ice phase Euler-Poincare characteristic was determined using a specifically written analysis program. Whenever contrast in the images was insufficient for the image analysis system to automatically distinguish ice and matrix separately, the interface between the two was identified manually, thus enabling accurate determination of the Euler-Poincare characteristic.

The Euler-Poincare characteristic can be measured for ice in an ice confection produced by any processing route.

Example 5

Comparative Example A

A water ice solution having the following composition was prepared as follows;

|  | Weight % |
| --- | --- |
| Sucrose | 20.0 |
| Locust Bean Gum | 0.2 |
| Water | to 100 |

Total soluble solids; 20.2% by weight
Ice content at −18° C.; 70% by weight

The water ice solution was prepared as follows;

All the water ice ingredients except AFP were mixed together using a high shear mixer for approximately 3 minutes. The water being added at a temperature at 80° C. The temperature of the water ice mix was approximately 55–65° C. after mixing.

The mix was then passed through to a plate heat exchanger for pasteurisation at 81° C. for 25 seconds. The mix was then cooled to approximately 4° C. in the plate heat exchanger prior to use.

After pasteurisation Type III AFP (as described in WO 97/02343) was added to the water ice solution in the following concentrations;

Example 5—0.005% by weight

Comparative Example A—no AFP

The water ice solution was frozen quiescently with no overrun being introduced as follows: The water ice solution was poured into split metal moulds producing bars having the dimensions 25×25×200 mm. They were then placed in the cold store overnight to freeze quiescently at a temperature of −25° C. The next day, the test bars were demoulded, placed in polythene bags and stored at −25° C.

The Euler-Poincare characteristic was measured as in Example 4.

Results are shown in Table 1.

TABLE 1

| Example | Euler-Poincare characteristic (mm$^{-2}$) |
| --- | --- |
| 5 | −383 |
| A | 4.3 |

Examples 6 & 7

Comparative Example B

A water ice solution having the following composition was prepared as follows;

|  | Weight % |
| --- | --- |
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 5. After pasteurisation Type III AFP (as described in Wo 97/02343) was added to the water ice solution in the following concentrations;

Example 6—0.0005% by weight

Example 7—0.005% by weight

Comparative Example B—no AFP

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

Contiguity was measured as in Example 2.

Results are shown in Table 2

TABLE 2

| Example | Contiguity |
| --- | --- |
| 6 | 0.24 |
| 7 | 0.22 |
| B | 0.11 |

Example 8

Production of a "gobstopper" product having different coloured and flavored water ice layers sequentially built up around an ice cream core.

The use of water ice composition according to the invention provides a product which is very hard and forces the consumer to lick, rather than bite, the product and so each water ice layer is gradually revealed.

Further, the layers of water ice remain discrete and little or no colour "bleed" between layers is observed.

An unaerated sphere of ice cream (20–30 mm in diameter) having the following formulation was moulded onto a stick as follows;

| Ice cream composition | |
|---|---|
| | % (weight) |
| Double Cream | 26.5 |
| Skimmed Milk Powder | 9.2 |
| Sucrose | 16.0 |
| Water | to 100 |

The ice cream pre-mix was poured into an aluminium mould and the mould was cooled in a blast freezer at −35° C. When the ice cream pre-mix was partially frozen a stick was inserted. When totally frozen the ice cream was demoulded by spraying the outside of the mould with water at 5° C.

The ice cream core was pre-cooled by immersion in solid $CO_2$ (dry ice) for approximately 2 minutes then dipped into a water ice mix having the following formulation;

| Water Ice Composition | |
|---|---|
| | % (weight) |
| Sucrose | 15.0 |
| Dextrose | 5.0 |
| Locust Bean Gum | 0.25 |
| Citric Acid | 0.5 |
| Flavour/Colour | 0.2 |
| Type III AFP* | 0.005 |
| Water | to 100 |

*as described in WO 97/02343
Total Solids; 20.5%
Ice Content at −18° C.; 68.0% by weight The product was then sequentially dipped into water ice mix to build up a number of layers (typically from 12 to 15) of different colours and flavours. Between each dip into the water ice mix the product was cooled in dry ice to facilitate pick-up of the next water ice layer.

The resulting product was a sphere of approximately 3–5 cm diameter.

Example 9

A water ice solution having the following composition was prepared;

| | % weight |
|---|---|
| Sucrose | 10.0 |
| Glucose | 5.0 |
| Locust Bean Gum | 0.2 |
| Citric Acid | 0.5 |
| Water | to 100 |

The composition was divided into four and the following colour and/or AFP added.

| (i) Cherry flavour/colour | 0.5% w/w |
|---|---|
| AFP* | 0.005% w/w |
| (ii) AFP* | 0.005% w/w |
| (iii) Cherry flavour/colour | 0.5% w/w |
| (iv) No additions | |

*AFP as in WO 97/02343

Dual colour water ice monobites were manufactured either out of (i) and (ii) above (i.e. containing AFP) or out of (iii) and (iv) above (no AFP) as follows:

5 ml of non-coloured water ice solution ((ii) or (iv)) was aliquoted into latex ice cube moulds. This was frozen for 1 hour in a blast freezer at −35° C. 5 ml of red water ice mix ((i) or (iii)) was then used to fill the remaining mould volume and the moulds were blast frozen at −35° C. for a further hour. The moulds were then transferred to a cold store at −25° C. overnight prior to demoulding. Once demoulded, the monobites were transferred into individual plastic pots with sealed lids and stored at −10° C. for 1, 2, 3, 5 & 7 weeks.

Photographs were taken at time 0 and after the specified time period.

Whereas the AFP containing sample showed little or no merging of the colours even after 7 weeks at −10° C., the non-AFP containing sample showed colour merging after only 1 week at −10° C. and the entire sample was almost a single blended colour after 7 weeks at −1° C.

Example 10

Water ice samples in three flavours, with and without AFP, were manufactured and assessed by Time Intensity sensory methodology, as detailed below.

| Water Ice Samples | |
|---|---|
| | % (w/w) |
| Sucrose | 13.7 |
| Glucose | 5.9 |
| Stabiliser | 0.15 |
| Citric Acid | 0.3 |
| AFP* | 0.005 |
| Colour/Flavour | see below |
| Water | to 100 |

Orange Flavour/Colour: 1.0%
Strawberry Flavour/Colour: 0.8%
Cherry Flavour/Colour: 0.3%
*as described in WO 97/02343

All the water ice ingredients except AFP were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

All products were prepared in the same way. Liquid mixes were dispensed into small plastic tubs (approximately 100 ml) at chill temperatures (4° C.). These tubs were then blast frozen for 3 hours at −35° C. before being transferred to cold storage at −25° C. Prior to assessment these blocks of water ice were cut into uniform size pieces (approx 2 cm×2 cm×1 cm) and equilibrated to −18° C. overnight.

Sensory Methodology

Products were assessed by a highly trained sensory panel.

A Descriptive Analysis methodology was used whereby trained panellists identified and quantified the main sensory properties of water ices with and without AFP. The basic features which this method involves are given in Sensory Evaluation Techniques, $2^{nd}$ Edition (1991) M Meilgaard, G. V. Civille and B. T. Carr, CRC Press and include;

- The development of the sensory descriptors by the panel, referred to hereafter as the attribute profile.
- Consensus agreement of common scores on each sensory attribute of a 'control' produce.
- Assessment of some commercial and experimental samples to monitor panel performance prior to the panelling of all the experimental samples.
- All tasting sessions are carried out in individual booths, in a controlled environment to eliminate bias from external variables.
- Analysis of data via Analysis of Variance (ANOVA) with Duncan's Multiple Range comparison test to check for statistically significant (p=<0.05) differences between samples.

Time Intensity Panelling

Time Intensity (TI) is a method of sensory profiling that measures how an individual attribute changes with time, giving a quantifiable measurement of the "dynamic" aspects of sensory perception. It differs from other sensory techniques in that all panellists are treated as individuals and therefore it is important that they are reproducible within themselves rather than against some panel mean.

Background to Data Analysis

The approach to the analysis of TI data is to calculate a number of parameters (e.g. Maximum height, area under the curve) that characterize each curve, and then analyse how test factors (such as product used) affect the values of these parameters. The emphasis of this approach is, therefore, to find significant differences between products rather than individual panellist differences.

Experimental Design

The trial was carried out using a statistical design. Products were presented in a random order, a blind control was included and an open control was used at the beginning of each session.

Number of panellist: 10

Number of session: 3 for each trial

Period of time allow for the evaluation: 30 seconds

Samples Assessed (Formulations as Detailed Above)

1. Cherry Water Ice
2. Cherry Water Ice+AFP
3. Strawberry Water Ice
4. Strawberry Water Ice+AFP
5. Orange Water Ice
6. Orange Water Ice+AFP Results a. Strawberry Flavour The mean duration of the maximum strength of flavour was significantly longer for the sample containing AFP than the control.

b. Cherry Flavour

The mean duration of the maximum strength of flavour was significantly longer for the sample containing AFP than the control.

C. Orange Flavour

The mean duration of the maximum strength of flavour was significantly longer for the sample containing AFP than the control.

What is claimed is:

1. A method of restricting the flow of flavor ions or flavor molecules or color ions or color molecules present as either solutes or a dispersion within an ice confection, comprising adding an antifreeze protein to said confection whereby the ice confection composition contains;

(i) an antifreeze protein, and
   (ii) no protein other than the antifreeze protein.

2. A method according to claim 1 wherein the ice confection is a water ice.

3. A method according to claim 1 wherein the antifreeze protein is chosen such that it provides an aspect ratio of more than 1.9 to the ice crystal.

4. A method according to claim 1 wherein the antifreeze protein is AFP Type III HPLC12.

5. A method according to claim 1, wherein the antifreeze protein is present at a concentration of at least 0.0005% by weight.

6. A method according to claim 1, wherein the ice confection has a contiguity of at least 0.2 and an ice content of from 50 to 900% by weight when measured at −18° C.

7. A method according to claim 1, wherein the ice confection has a Euler-Poincare characteristic of less than −150 $mm^2$ and an ice content of from 50 to 90% by weight when measured at −18° C.

* * * * *